United States Patent [19]

Foster

[11] Patent Number: 4,853,675
[45] Date of Patent: Aug. 1, 1989

[54] APPARATUS FOR DETERMINING IMPACT FORCE UPON A VEHICLE IN TRAVELING A CURVE

[76] Inventor: Asa D. Foster, 5947 Xerxes Ave. S., Minneapolis, Minn. 55410

[21] Appl. No.: 193,729

[22] Filed: May 12, 1988

[51] Int. Cl.$^4$ .............................................. B60Q 1/00
[52] U.S. Cl. ................................... 340/429; 340/440; 340/671; 340/689
[58] Field of Search ............... 340/52 H, 689, 61, 666, 340/669, 671, 429, 440, 438; 200/61.47, 221, 222, 224; 180/172, 282

[56] References Cited

U.S. PATENT DOCUMENTS

| 1,626,567 | 4/1927 | Steinbrecht | 200/61.47 |
| 3,798,593 | 3/1974 | Sartor | 340/52 |
| 3,865,305 | 2/1975 | Sampey | 235/92 |
| 4,284,987 | 8/1981 | Gibson et al. | 340/689 |
| 4,349,809 | 9/1982 | Tomes | 340/52 |
| 4,386,674 | 6/1983 | Sugata | 180/142 |
| 4,459,115 | 7/1984 | Ballard | 340/689 |
| 4,692,882 | 9/1987 | Skovgaard et al. | 340/52 H |
| 4,737,759 | 4/1988 | Stropkay et al. | 340/52 H |

Primary Examiner—Glen R. Swann, III
Assistant Examiner—Brent A. Swarthout
Attorney, Agent, or Firm—Leo Gregory

[57] ABSTRACT

An apparatus mounted upon an automotive vehicle to determine the impact of centrifugal force upon the vehicle in traveling through a curve of a road for the purpose of ascertaining an upper safe speed limit for posting the curve.

7 Claims, 4 Drawing Sheets

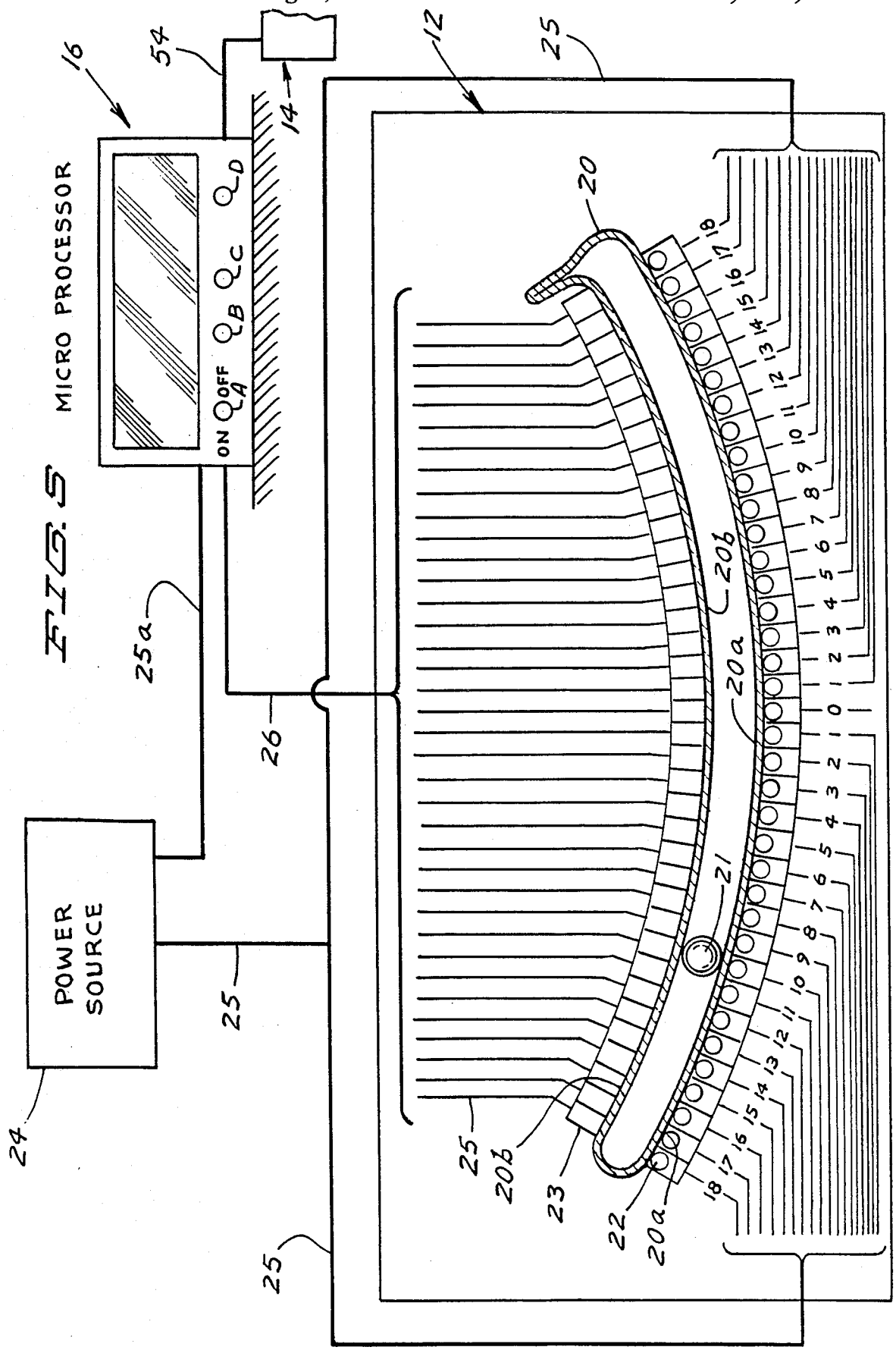

APPARATUS FOR DETERMINING IMPACT FORCE UPON A VEHICLE IN TRAVELING A CURVE

BACKGROUND OF THE INVENTION

1. Field of Invention

This invention relates to determining the impact of centrifugal force upon an automotive vehicle in passing through a curve of a road to ascertain a safe curve speed.

2. Description of the Prior Art

Much effort has been directed upon the impact or influence of centrifugal force upon an automotive vehicle in negotiating a curve of a road to have the speed of the vehicle retained within a safe driving limit.

In U.S. Pat. No. 3,798,593 to Sartor, a device is disclosed which provides an alarm to indicate when a vehicle is exceeding a pre-set speed limit in rounding a curve.

U.S. Patent No. 4,349,809 to Tomes discloses an apparatus detecting an unsafe angle of inclination of a motor vehicle in negotiating a curve and an alarm is sounded when a pre-set safe limit of speed and degree of inclination are exceeded.

U.S. Patent No. 4,386,674 to Sugata provides means to prevent oversteering on a curve by increasing the force required to turn the steering wheel in relation to the speed of travel.

As indicated by the above reference material, effort has been made to pre-set limits for movement of the vehicle. However it is desirable to determine the impact of centrifugal force upon an automotive vehicle in traveling through a curve for the purpose of posting or signing the curve with an upper safe speed limit.

SUMMARY OF THE INVENTION

In view of the preceding observations, it is an object of this invention to provide an apparatus which will measure the angle or degree of inclination or deflection experienced by an automotive vehicle in traveling through a curve at various speeds for the purpose of determining an upper safe speed limit of travel which will be at a safe angle of inclination of the vehicle to travel the curve at an appropriate safe speed.

It is another object of this invention to provide a vehicle mounted apparatus which can determine as a function of the speed of the vehicle, the impact of forces upon the vehicle in passing through a curve with a visual output reading being given on a screen or printed on a tape which will indicate an upper safe limit of speed for the particular curve passed through.

It is more specifically an object of this invention to provide an apparatus which embodies the use of a transmission sensor and conversion means to determine the speed of a vehicle and a measuring device which provides a reading of the degree of tilt of a vehicle in passing through a curve. The information thus ascertained is fed into a microprocessor which in a data acquisition function outputs the information obtained as a reading, which is a factor representing degrees of incline at a specific speed and at specific places in the curve to indicate a safe upper level of speed at which a vehicle may pass through the measured curve.

It is also an object of this invention to provide an apparatus in connection with a motor vehicle which quickly and expeditiously determines the impact of centrifugal force upon the vehicle at any given speed of travel for any given curve which is passed through and provides a reading of of the same for the purpose of posting the curve.

These and other objects and advantages of the invention will be set forth in the following description made in connection with the accompanying drawings in which like reference characters refer to similar parts throughout the several views.

BRIEF DESCRIPTION OF THE DRAWINGS

FIG. 5 is a diagrammatic illustration of a detail of the internal structure of the apparatus of FIG. 3;

DESCRIPTION OF A PREFERRED EMBODIMENT

Figure 1:
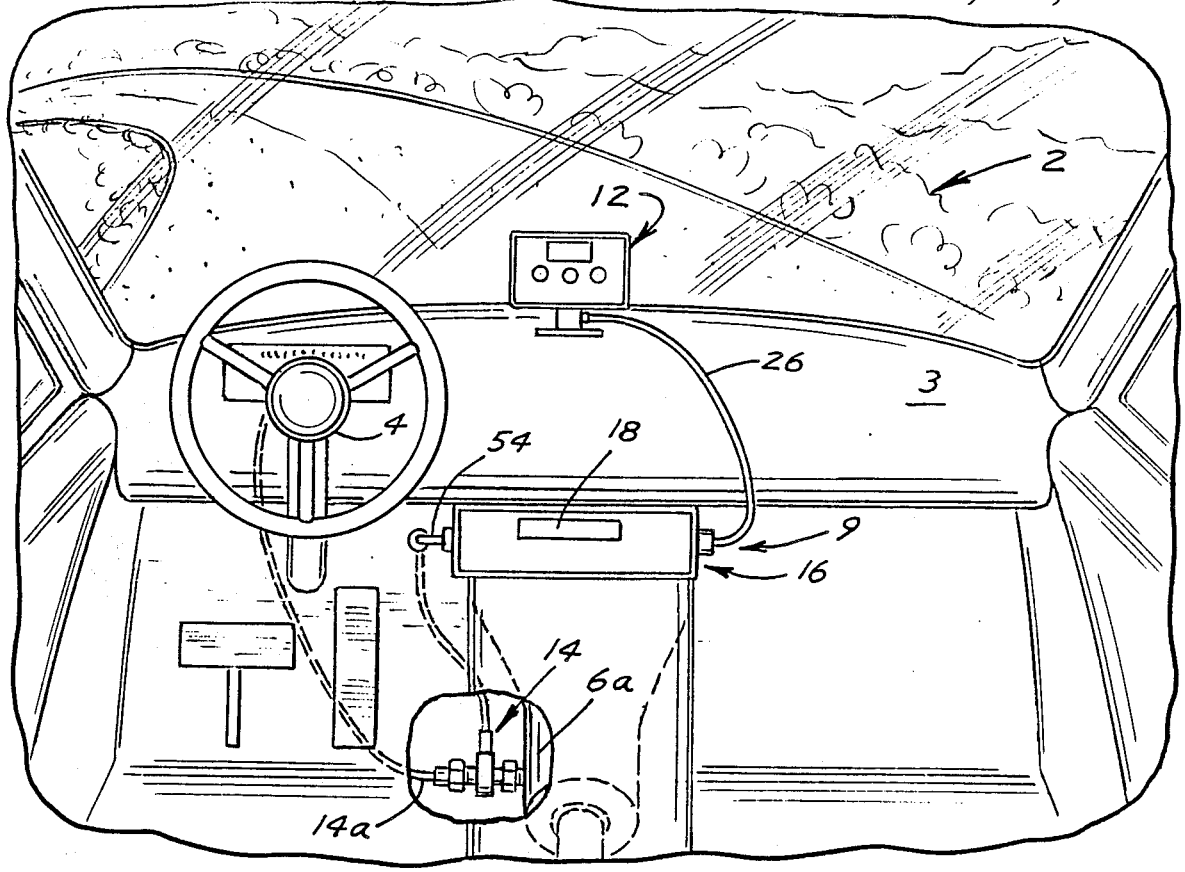
FIG. 1 is a broken view in perspective showing the partial interior of an automotive vehicle facing the steering column and dash board area with a floor portion thereof broken away.

With reference to the drawings, the apparatus herein is indicated generally by the reference numeral 9. Said apparatus comprises as one element, a tilt or deflection indicator or slope meter 12 which is arranged and constructed mounted onto a vehicle to give a reading representing the impact of centrifugal force upon a vehicle by indicating the degree of inclination or deflection of the vehicle in degrees in being driven through a curve.

A second element of said apparatus is a speed indicator 14 which is operatively connected to a shaft rotated by the transmission of a vehicle and is referred to as a pulse generator.

Figure 4:
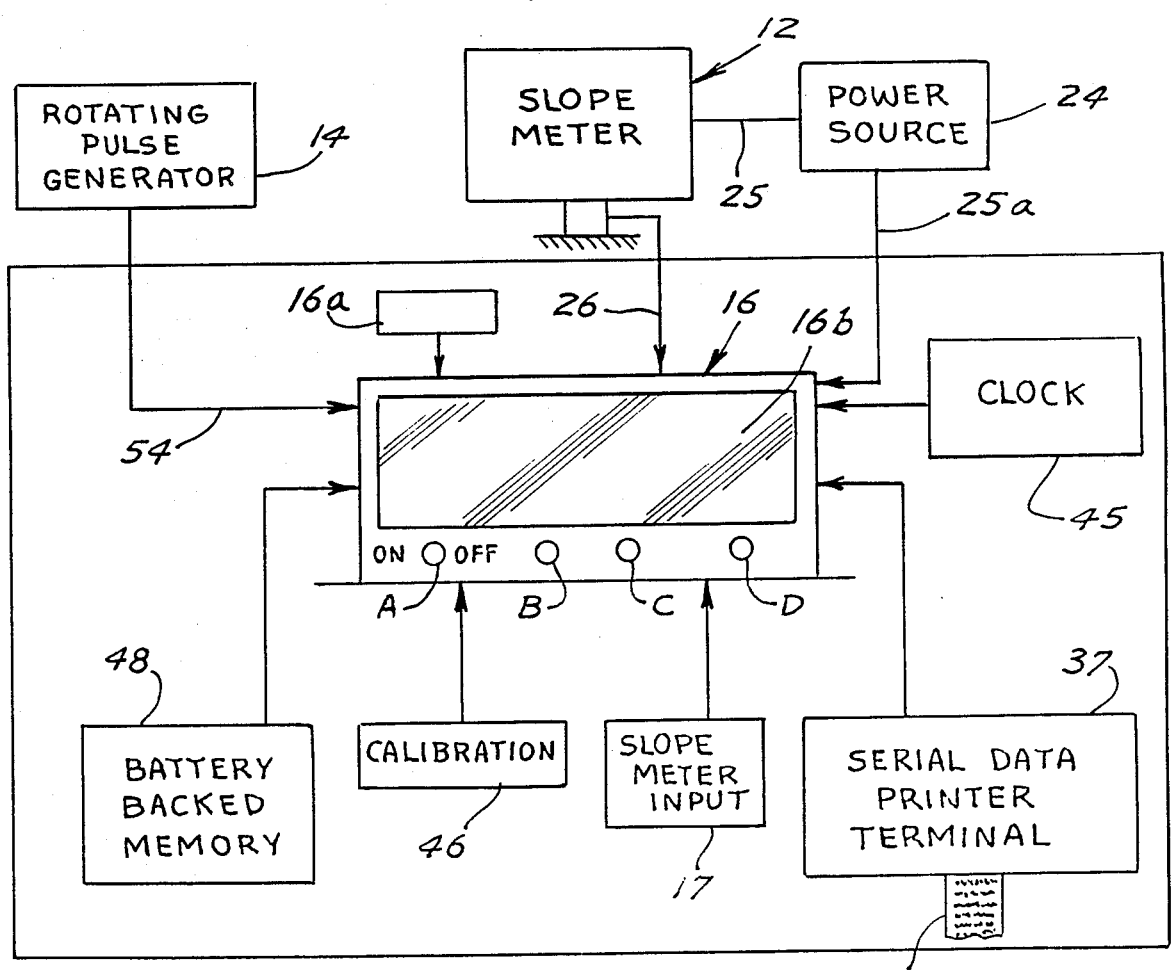
FIG. 4 is a schematic block diagram of electronic elements of the apparatus.

A third element of the apparatus is a microprocessor 16 which is also referred to herein as a data acquisition unit an identified in FIG. 4 by the letters CPU and which with certain tables therein to be described is in communication with and programmed to correlate the data from said other two elements which it outputs as a reading to be described, on a tape 38 and/or on a screen 12a or an alternate screen 16b. The reading indicates whether a safe curve speed is being observed.

There are conventional microprocessors available which have adequate computational power to be programmed to carry out the functions to be indicated herein and which can be equipped as indicated.

The vehicle illustrated in which the above said apparatus 9 is mounted is indicated generally by the reference numeral 2 and includes a dashboard 3, a steering assembly 4 and a transmission 6 which will be further described.

The vehicle tilt or deflection indicator 12 will first be described. A mechanical form of this element is described in the applicant's U.S. Pat. No. 2,357,817 issued Sept. 12, 1944. The patented structure discloses a steel ball disposed within a transparent curved tube level. The scale on the tube level discloses a percentage of slope and this scale was subsequently changed to give a reading in degrees to indicate the combined effect of a vehicle body roll angle or tilt which has implicit within it the impact of the centrifugal force upon the vehicle taking into consideration the radius of the curve and speed of travel of the vehicle. The structure embodies an indicator showing extent of right and left hand tilting and having indicia on the tube to show a safe tilting or deflection range.

In the present application, the patented structure has been modified, as illustrated in FIG. 5, to be electronically operated. The structure herein embodies a curved tube level 20 having therein a steel ball 21 and in place of the indicia in the patented structure there are a series of infra-red emitter sensors 22 mounted on the leading edge or forward side 20a of said tube and the same are paired with corresponding infra-red detecting or receiving sensors 23 on the opposite or rear side 20b of said tube 20. Said emitting and corresponding opposed detecting sensors are included in a circuit 25 which is connected to a suitable power source 24 and which is in circuit with said microprocessor 16 by a line 26 as shown in FIG. 4. LED's may be used if desired.

As shown here, for purpose of illustration, there are eighteen opposed pairs of said emitter-receiver sensors 1-18SL mounted on the left hand half of said tube 20 as viewed in FIG. 5 and a like number 1-18SR on the right hand half of said tube at either side of a zero reading. The specific number of sensors is a matter of choice. Said sensors indicate to said microprocessor either a right hand or left hand tilt of the vehicle and the position of the ball therein indicating the degree of tilt.

Said indicator 12 is mounted preferably on the dash of a vehicle to have said tube 20 horizontally disposed and upon the occasion of the vehicle tilting, said ball 21 moves within said tube 20 interrupting the transmission of light in passing between corresponding of said emitter and detector sensors. The tilt indicator outputs the balls position such as every second.

Said microprocessor in circuit with said sensors is programmed to sense and read each of said interruptions as a ball position and interprets each such ball position as a reading of a degree of tilt of the vehicle or in other words a reading of the degree of impact of centrifugal force upon the vehicle in negotiating a curve and each changed tilt position is stored in its memory 48. The leading of the ball positions is coupled with the speed of travel of the vehicle as will be described.

Said microprocessor in reading the various positions of the ball 21 brings these readings into its internal table 16a which interprets the ball positions as degrees of inclination and outputs this information to a table 17 which is programmed to interpret and coordinate the degrees of inclination indicated by the pattern of positions of said ball and in connection with the speed of the vehicle as will be described converts the same into a composite factor of a degree of impact force such as the digit 10° indicated at 12c in FIG. 3 and to be further described.

Needed to be ascertained in addition to the tilt of the vehicle is an accurate measurement of the speed of travel of the vehicle. The speed is ascertained from the operation of the speed indicator 14. This element may take any one of several forms. It has been found that a preferred accurate measure of the speed of a vehicle is that measured by a proximity transmission sensor which is what is here indicated. The transmission sensor herein produces a pulse or signal in the same manner as the wheel sensor provided by NU-METRICS, Inc. of Cedar Valley, Vanderbilt, Pa. as model K-4500 and as set forth in its U.S. Pat. No. 3,865,305.

Figure 2:
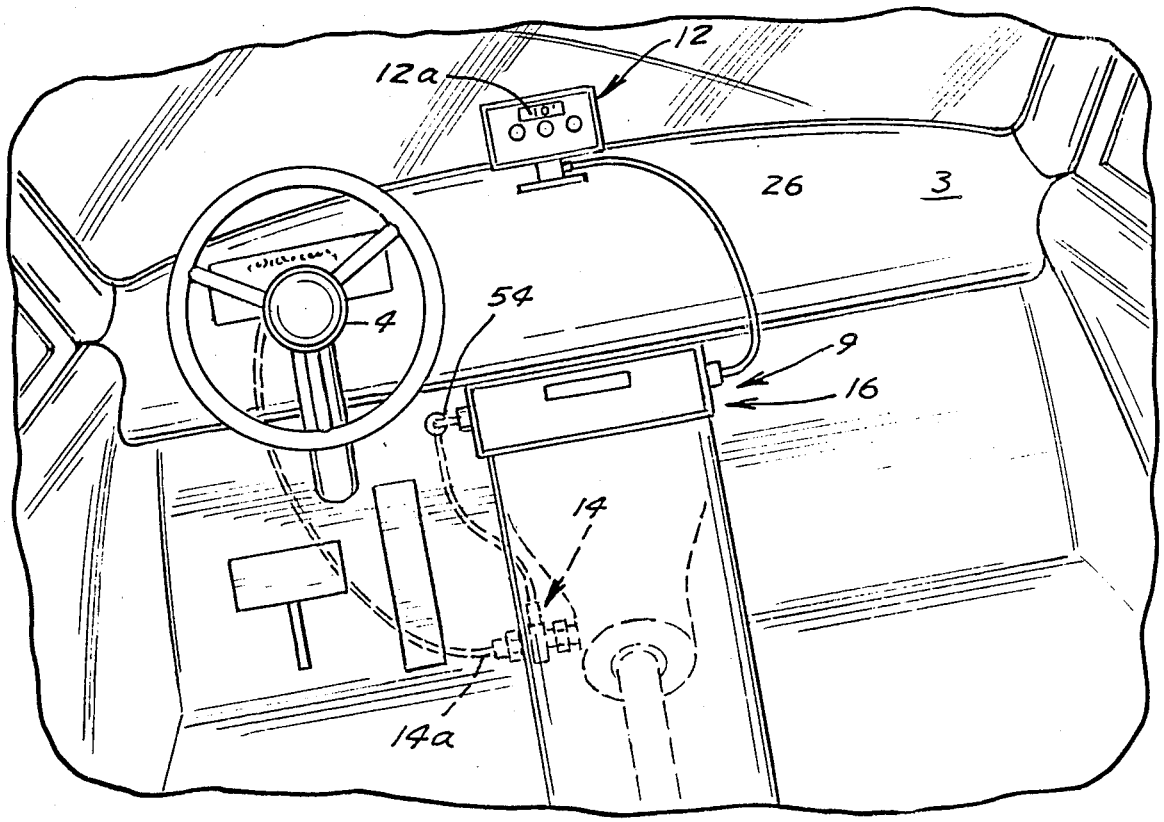
FIG. 2 is a view similar to that of FIG. 1 showing the vehicle in a sideways inclined position.
Figure 7:
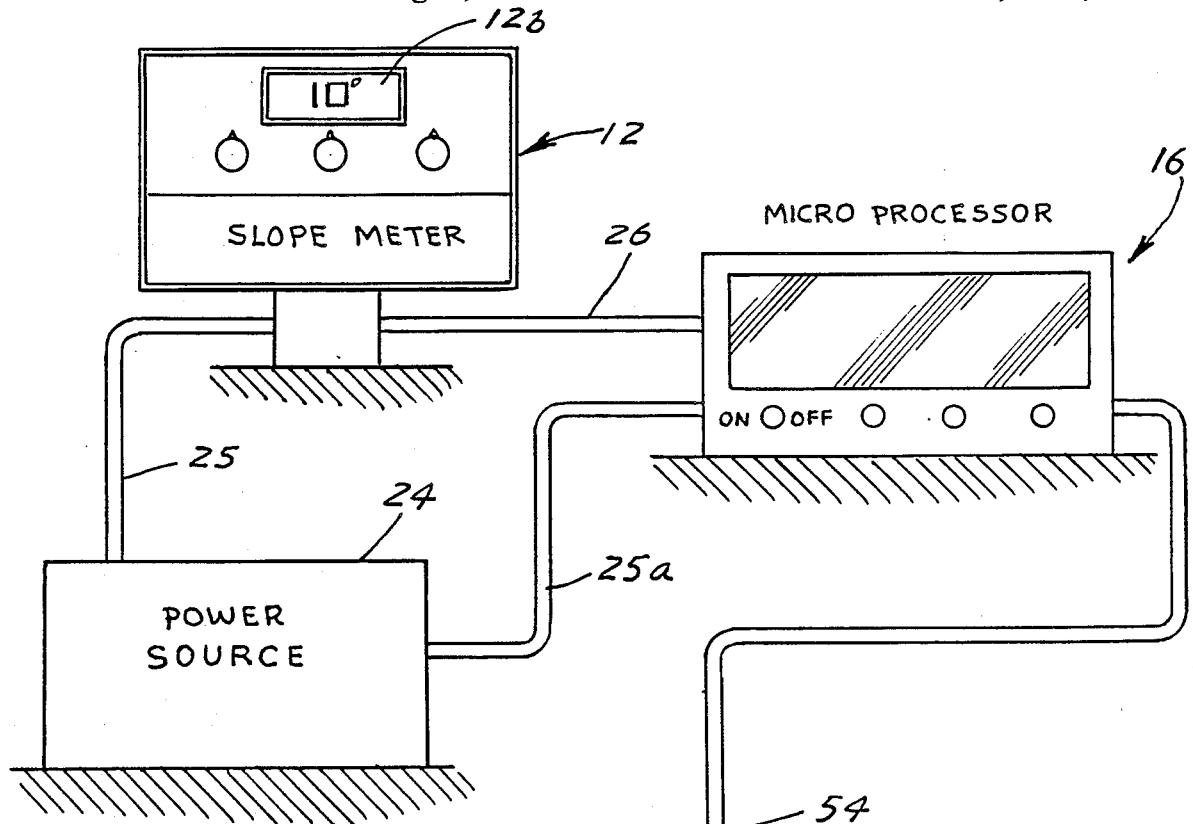
FIG. 7 is a sectional view in elevation indicating a transmission sensor and a schematic view of a microprocessor and related circuitry.
Figure 6:
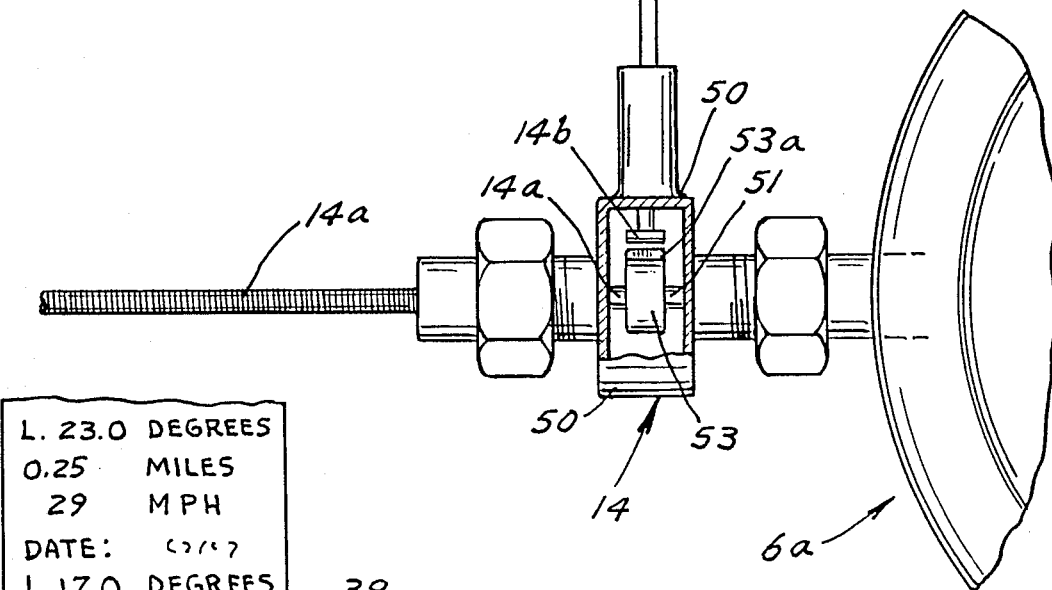
FIG. 6 is a plan view of a broken away piece of a strip chart showing elements of information.

The housing 50 of said sensor 14 is mounted onto the transmission 6a as in FIG. 2 and as further shown in more detail in FIG. 7.

The conventional speedometer cable 14a is disconnected from its transmission connection which is here shown as a shaft 51 which is rotated with the driveshaft. The sensor housing 50 is installed therebetween and a rotating coupling 53 in said housing driven by said shaft 51 is connected between it and said speedometer cable.

The sensor housing includes a magnetic disc-like member 14b mounted onto an inner wall portion thereof in close proximity to said coupling 53 and attached to said coupling is a metal target 53a whereby upon each rotation of the coupling 53 and of the driveshaft of the vehicle, as said target passes by the magnetic member 14b, a pulse is generated which pulse is picked up by a sensor wire 54 which places said transmission sensor in circuit with said microprocessor and with its internal calibration table 46a which counts said pulses and which with the input of seconds of time from the internal clock 45 of said microprocessor computes a rate of speed.

In a preliminary testing arrangement, the vehicle is run over a pre-measured course such as of one mile to count the number of pulses generated to compute the distance traveled for each pulse generated. The calibration table 46 counts the number of pulses and in connection with the input of time from the internal clock 45, this table outputs a reading of the speed traveled based on the pre-measured distance traveled per pulse.

Figure 3:
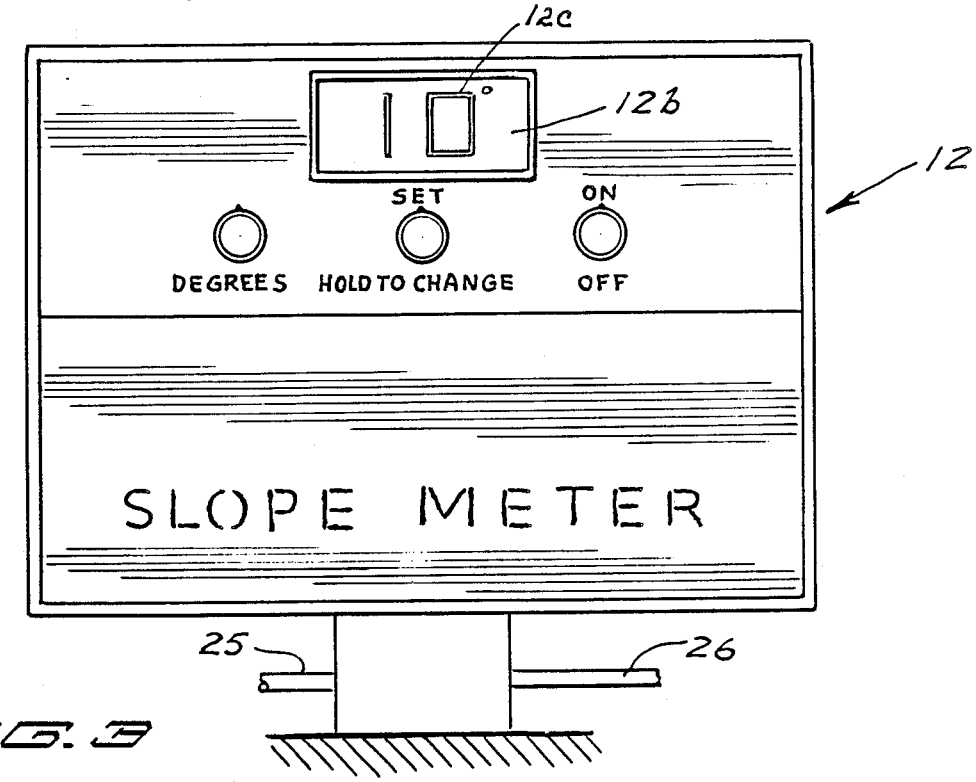
FIG. 3 is the front elevational view of a piece of apparatus showing a screen which gives a reading of a degree of inclination.

The rate of speed traveled in testing a curve and the tilt of the vehicle is received by the input table 17 for coordination and the result is brought into the microprocessor and is output as a factor onto the screen 16b or 12b such as the digit 10° indicated by 12c on the screen 12b in FIG. 3. The significance of said factor will be described.

To review the operation and add further description, the sensor 14 gives distance traveled in measured pulses and the internal clock 45 gives the time of travel for calculation of speed of travel. The pulses are counted with elapsed time by the calibration table to compute the speed of travel. The degree of tilt is outputted every second and transmitted to the input table 17 and brought into the microprocessor as a number every second. If the input data is the same, it is ignored. If the data is different, then it is stored in the memory 48 as time, distance and speed traveled.

The knob A is an on-off switch and in being turned on energizes the apparatus. Upon starting, the microprocessor commences watching the second pulse from its internal clock for the time element which is picked up by the calibration tale, it watches the pulse from the transmission sensor which is picked up by the calibration table and it watches the input from the tilt indicator which is picked up by the input table 17.

All readings made by the microprocessor go into its memory 48 and data is sent to the screen 16b or 12b as ordered up by operation of the knobs B or C, or it may be ordered by knob D to transmit serial data to the internal printer 37 to be output on a tape or strip chart 38.

The microprocessor is programmed to cause a display on the screen 16b or 12b, as the case may be, of a composite factor of its readings which will be described. The operation of the knob D will cause serial data to be output to the printer which will consist of the factor appearing on the screen and in addition, distance traveled in making any given test run, the speed of travel and the date of the test run. When a test is completed the memory is cleared.

The degree of tilt is a composite factor which reflects the radius of the curve, its super elevation, the speed of travel and the impact of centrifugal force at the rate of speed traveled. The tape provides a permanent record.

Many state agencies have established criteria for posting speeds on curves and this is referred to as signing curves. Some state agencies use a factor of 10° as an indication of an upper limit of safe speed travel through a curve at whatever rate of speed. Many state agencies use a 14°, 12° and 10° criteria.

In testing a curve, several passes through it may be made to arrive at a reading which will give an upper safe limit of travel speed. For examples, if a reading is 14° or greater at 20 mph or less, the upper safe limit of travel speed is 20 mph. A reading of 12° would indicate a safe upper speed limit of 30 mph. A reading of 10° would indicate a safe upper speed limit of 35 mph. In the event a curve may be traveled at the legal speed limit, it need not be posted.

Other items of information may be provided and the microprocessor will be programmed accordingly. What the apparatus herein accomplishes is to provide an accurate reading of the degree of tilt a vehicle experiences considering speed, radius of the curve and impact force upon it. The radius of the curve need not be measured. With the data produced by the apparatus, the operator can determine in his judgment or by his criteria what the upper safe speed limit is for any given tested curve and post or sign the curve accordingly. The presumed use of the apparatus herein is by highway agencies.

It will of course be understood that various changes may be made in form, details, arrangement and proportions of the parts without departing from the scope of the invention herein which, generally stated, consists in an apparatus capable of carrying out the objects above set forth, in the parts and combination of parts disclosed and defined in the appended claims.

What is claimed is:

1. An electronic apparatus mounted upon a vehicle measuring the tilt of the vehicle and the impact force upon the vehicle in passing through a curve to ascertain the upper safe speed limit of travel therethrough for the purpose of posting the curve, having in combination speed detecting means having an operating connection with the transmission of the vehicle generating timed electrical pulses indicating distance traveled responsive to the rotation of the drive shaft of the vehicle, a tilt indicating means carried by said vehicle sensing the tilt of the vehicle at each different rate of speed in passing through a curve, a microprocessor in circuit with said speed detecting means and said tilt indicating means, said microprocessor having an internal clock and a calibration table counting said pulses to ascertain the distance traveled and the speed of travel, said pulses having first been counted over a pre-measured distance to determine the distance of travel indicated by each pulse.

said microprocessor having a tilt input table interpreting the sensed tilt of said vehicle at each different speed as a degree of tilt, and said microprocessor outputting a composite factor indicating impact force in digital form and representing the degree of safety experience, in passing through a curve.

2. The structure of claim 1, wherein
said tilt indicating means comprises
an elongated curved tube level,
infra-red emitters and corresponding opposed detectors in a circuit being respectively disposed at each side of said tube,
a ball in said tube movable responsive to the tilt of said vehicle interrupting transmission between corresponding emitters and detectors,
said microprocessor senses the interrupted transmissions and reads the same as positions of said ball, and
a table included in said microprocessor converting the sensed positions of said ball into respective degrees of tilt, said degrees of tilt having implicit therein the influence of the speed of the vehicle and the radius of the curve.

3. The structure of claim 1, wherein
said microprocessor includes a screen and an internal printer to respectively display and print said composite factor, and
means carried by said microprocessor for activating said screen or said printer.

4. The structure of claim 1, wherein
said speed detecting means comprises a proximity sensor, and
means rotated by said drive shaft arranged and constructed to create an electrical pulse with each rotation of said drive shaft in passing by said proximity sensor to indicate distance traveled.

5. The structure of claim 1, wherein
said tilt indicating means comprises
an elongated tube level,
opposed emitters and sensors at each side of said tube level having transmission of light therebetween,
means energizing said emitters and sensors,
a ball movable in said tube interrupting said transmission of light between opposed of said emitters and sensors,
said microprocessor sensing the interruptions and thereby the changed positions of said ball in said tube level,
said ball moving with the changed tilt of the vehicle, influenced by the speed of the vehicle and the impact of centrifugal force upon the vehicle,
a table included in said microprocessor receiving said changed positions of said ball,
said table converting said changed positions sensed into a serial data output,
said microprocessor including an internal printer, and
said microprocessor outputting said serial data to said printer.

6. The structure of claim 5, wherein
said microprocessor converts said changed positions of said ball into degrees of tilt having implicit therein the influence of the speed of the vehicle, the radius and superelevation of the curve and the impact of centrifugal force upon the vehicle,
said microprocessor including a screen, and
said microprocessor displaying said degrees of tilt in digital form on said screen.

7. The structure of claim 5, wherein
said serial data output comprises the degree of tilt, the distance traveled and the speed of the vehicle in making a test run of a curve.

* * * * *